United States Patent
Iida et al.

(10) Patent No.: US 10,297,824 B2
(45) Date of Patent: May 21, 2019

(54) POSITIVE ELECTRODE ACTIVE MATERIAL FOR LITHIUM SECONDARY BATTERY, POSITIVE ELECTRODE, AND SECONDARY BATTERY

(71) Applicants: Tanaka Chemical Corporation, Fukui-shi, Fukui (JP); Sumitomo Checmical Company, Limited, Tokyo (JP)

(72) Inventors: Yasutaka Iida, Fukui (JP); Daisuke Yamashita, Fukui (JP); Takaaki Masukawa, Fukui (JP); Hiroyuki Ito, Fukui (JP); Hiroyuki Kurita, Tsukuba (JP); Kenji Takamori, Tsukuba (JP); Yuichiro Imanari, Tsukuba (JP)

(73) Assignees: Tanaka Chemical Corporation, Fukui-shi, Fukui (JP); Sumitomo Chemical Company, Limited, Tokyo (JP)

( * ) Notice: Subject to any disclaimer, the term of this patent is extended or adjusted under 35 U.S.C. 154(b) by 149 days.

(21) Appl. No.: 14/902,041

(22) PCT Filed: Jul. 1, 2014

(86) PCT No.: PCT/JP2014/067555
§ 371 (c)(1),
(2) Date: Dec. 30, 2015

(87) PCT Pub. No.: WO2015/005180
PCT Pub. Date: Jan. 15, 2015

(65) Prior Publication Data
US 2016/0372749 A1    Dec. 22, 2016

(30) Foreign Application Priority Data

Jul. 10, 2013   (JP) .................................. 2013-144947

(51) Int. Cl.
*H01M 4/52* (2010.01)
*H01M 4/505* (2010.01)
(Continued)

(52) U.S. Cl.
CPC ............ *H01M 4/525* (2013.01); *C01G 53/50* (2013.01); *H01M 4/366* (2013.01); *H01M 4/505* (2013.01);
(Continued)

(58) Field of Classification Search
CPC ....... H01M 4/02–4/0497; H01M 4/13–4/1315; H01M 4/139–4/13915;
(Continued)

(56) References Cited

U.S. PATENT DOCUMENTS 6,447,958 B1    9/2002   Shinohara et al.
2002/0053663 A1  5/2002   Ito et al.
(Continued)

FOREIGN PATENT DOCUMENTS

CN    1723576 A    1/2006
CN    1856890 A    11/2006
(Continued)

OTHER PUBLICATIONS

Chinese Office Action dated Mar. 3, 2017 from corresponding Chinese Patent Application No. 201480038864.0, 11 pages.
(Continued)

*Primary Examiner* — Jonathan G Leong
*Assistant Examiner* — Jacob Buchanan
(74) *Attorney, Agent, or Firm* — Ohlandt, Greeley, Ruggiero & Perle, L.L.P.

(57) ABSTRACT

Provided is a positive electrode active material which is useful for a lithium secondary battery having a battery resistance lower than that of the conventional positive electrode active material below freezing point. The positive (Continued)

electrode active material for a lithium secondary battery contains at least one element selected from a group consisting of nickel, cobalt and manganese, the positive electrode active material having a layered structure and satisfying all of the following requirements (1) to (3): (1) a primary particle size is 0.1 μm to 1 μm and a secondary particle size is 1 μm to 10 μm; (2) in an X-ray powder diffraction measurement using CuKα radiation, a crystallite size in the peak within 2θ=18.7±1° is 100 Å to 1200 Å and a crystallite size in the peak within 2θ=44.6±1° is 100 Å to 700 Å; and (3) in a pore distribution obtained by a mercury intrusion method, a pore peak exists in a range where the pore size is 10 nm to 200 nm and a pore volume in the said range is 0.01 $cm^3/g$ to 0.05 $cm^3/g$.

14 Claims, 2 Drawing Sheets

(51) Int. Cl.
| | | |
|---|---|---|
| *H01M 4/131* | (2010.01) | |
| *H01M 10/0525* | (2010.01) | |
| *H01M 4/525* | (2010.01) | |
| *C01G 53/00* | (2006.01) | |
| *H01M 4/36* | (2006.01) | |
| *H01M 4/1391* | (2010.01) | |
| *H01M 4/02* | (2006.01) | |

(52) U.S. Cl.
CPC ..... *H01M 10/0525* (2013.01); *C01P 2002/20* (2013.01); *C01P 2002/60* (2013.01); *C01P 2002/72* (2013.01); *C01P 2002/76* (2013.01); *C01P 2004/53* (2013.01); *C01P 2004/61* (2013.01); *C01P 2004/62* (2013.01); *C01P 2006/10* (2013.01); *C01P 2006/12* (2013.01); *C01P 2006/14* (2013.01); *C01P 2006/16* (2013.01); *C01P 2006/17* (2013.01); *C01P 2006/40* (2013.01); *H01M 2004/028* (2013.01)

(58) Field of Classification Search
CPC ............... H01M 4/36; H01M 4/48; H01M 4/485–4/525; H01M 10/05–10/0525
See application file for complete search history.

(56) References Cited

U.S. PATENT DOCUMENTS

| | | | | |
|---|---|---|---|---|
| 2004/0234857 | A1* | 11/2004 | Shiozaki | B82Y 30/00 429/231.3 |
| 2006/0134521 | A1* | 6/2006 | Shima | C01G 55/002 429/231.1 |
| 2008/0032199 | A1* | 2/2008 | Ohzuku | H01M 4/505 429/304 |
| 2009/0035659 | A1* | 2/2009 | Takeuchi | H01M 4/131 429/223 |
| 2009/0104530 | A1 | 4/2009 | Shizuka et al. | |
| 2009/0142668 | A1 | 6/2009 | Ishii et al. | |
| 2009/0258296 | A1* | 10/2009 | Kawasato | H01M 4/131 429/223 |
| 2010/0020977 | A1 | 1/2010 | Furukawa | |
| 2010/0209771 | A1* | 8/2010 | Shizuka | B82Y 30/00 429/207 |
| 2011/0171529 | A1* | 7/2011 | Kono | H01M 4/0471 429/223 |
| 2011/0206990 | A1 | 8/2011 | Akagi et al. | |
| 2013/0011726 | A1* | 1/2013 | Takano | C01G 45/1228 429/188 |
| 2013/0029216 | A1 | 1/2013 | Kim et al. | |
| 2013/0045421 | A1 | 2/2013 | Kobino et al. | |
| 2013/0052535 | A1 | 2/2013 | Yanagihara et al. | |

FOREIGN PATENT DOCUMENTS

| | | | | |
|---|---|---|---|---|
| CN | 101447586 | A | 6/2009 | |
| CN | 101796672 | A | 8/2010 | |
| EP | 1391950 | A1 | 2/2004 | |
| EP | 2 006 937 | A2 | 12/2008 | |
| EP | 2 555 287 | A1 | 2/2013 | |
| JP | 10-162860 | | 6/1998 | |
| JP | 10324758 | | 12/1998 | |
| JP | 2000030686 | A | 1/2000 | |
| JP | 2001076724 | A | 3/2001 | |
| JP | 2002201028 | A | 7/2002 | |
| JP | 2008103308 | A | 1/2008 | |
| JP | 2009152188 | A | 7/2009 | |
| JP | 4556377 | B | 7/2010 | |
| JP | 2010278015 | A | 9/2010 | |
| JP | 2011029132 | A | 2/2011 | |
| JP | 2011105588 | A | 6/2011 | |
| JP | 2012-22896 | A | 2/2012 | |
| JP | 2012234766 | A | 11/2012 | |
| WO | 2009099158 | A1 | 8/2009 | |
| WO | WO-2011083861 | A1 * | 7/2011 | ......... C01G 45/1228 |

OTHER PUBLICATIONS

The Japan Society for Analytical Chemistry, X-ray Analysis Research Council (Feb. 10, 2002). Funmatsu X-sen Kaiseki-no Jissai-Rietveld-hou Nyuumon [Facts of X-ray Powder Analysis—Introduction to the Rietveld Method], 20 pages.
Waseda, Yoshio and Matsubara, Eiichiro (third edition, Apr. 30, 2002). X-sen Kozou Kaiseki—Genshi-no Hairetsu-o Kimeru—[X-ray Structural Analysis—Determining an Arrangement of Atoms—]. Tokoyo, Japan: Uchida Rokakuho Publishing, 10 pages.
Office Action (with English translation) dated Jan. 13, 2015 from corresponding Japanese Application No. 2013-144947, 6 pages.
Decision to Grant a Patent dated Feb. 6, 215 from corresponding Japanese Application No. 2013144947, 5 pages.
International Search Report and Written Opinion dated Oct. 7, 2014 from International Patent Application No. PCT/JP2014/067555, 11 pages.
International Preliminary Report on Patentability dated Jan. 21, 2016 from corresponding Application No. PCT/JP2014/067555, 11 pages.
Written Opinion dated Oct. 7, 2014 from corresponding Application No. PCT/JP2014/067555, 9 pages.
Extended European Search Report dated Jan. 20, 2017 from corresponding European Patent Application No. 1423282.0, 5 pages.
Japanese Office Action dated Aug. 29, 2016 from corresponding Japanese Application No. 2015-027964, 10 pages.
Chinese Office Action in the Corresponding Chinese Application No. 201480038864.0, dated Oct. 23, 2017, 21 pages.

* cited by examiner

POSITIVE ELECTRODE ACTIVE MATERIAL FOR LITHIUM SECONDARY BATTERY, POSITIVE ELECTRODE, AND SECONDARY BATTERY

BACKGROUND

1. Field of the Disclosure

The present disclosure relates to a positive electrode active material for a lithium secondary battery, a positive electrode and a secondary battery.

2. Discussion of the Background Art

Lithium metal composite oxides are used as a positive electrode active material of secondary batteries such as lithium secondary batteries. Lithium secondary batteries have already been put to practical use as small-sized power supply units for mobile telephones, notebook computers, or the like, and further attempts have been made to use them as middle-sized or large-sized power supply units for automotive applications or for power storage applications.

As a conventional positive electrode active material, Patent Document 1 discloses a positive electrode active material for a lithium secondary battery that is a lithium nickel manganese cobalt composite oxide having a pore radius of 1 μm and a pore volume of 0.55 cm³/g.

DOCUMENT LIST

Patent Document(s)

Patent Document 1: Japanese Laid-Open Patent Publication No. 2010-278015

SUMMARY

However, lithium secondary batteries obtained using the above-mentioned conventional lithium metal composite oxide as a positive electrode active material are unsatisfactory for applications requiring a high output power at a high current rate, in other words, automotive applications and power tool applications such as electric power tools. Particularly, they are unsatisfactory below freezing point, and thus an even higher output power is required.

The present disclosure has been made in view of such situations, and it is an object of the present disclosure to provide a positive electrode active material which is useful for a lithium secondary battery that exhibits a battery resistance lower than the prior art below freezing point, by controlling a particle aggregate morphology of the positive electrode active material for a lithium secondary battery. It is also an object of the disclosure to provide a positive electrode and a lithium secondary battery that employ such positive electrode active material for a lithium secondary battery.

In order to solve the aforementioned problem, according to an aspect of the disclosure, a positive electrode active material for a lithium secondary battery is provided that contains at least one element selected from a group consisting of nickel, cobalt and manganese, the positive electrode active material preferably having a layered structure that is represented by the general formula $Li_aM^1{}_sM^2{}_{1-s}O_2$, where $M^1$ represents an essential metal comprising one or more of Ni, Co and Mn, $M^2$ represents one or more optional metal among Fe, Cu, Ti, Mg, Al, W, Zn, Sn, Zr, Ga and V, "a" is $0.9 \leq a \leq 1.2$, and "s" is $0.9 \leq s \leq 1$, the positive electrode active material satisfying all of the following requirements (1) to (3):

(1) a primary particle size is greater than or equal to 0.1 μm and less than or equal to 1 μm and a secondary particle size is greater than or equal to 1 μm and less than or equal to 10 μm;

(2) in an X-ray powder diffraction measurement using CuKα radiation, a crystallite size in the peak within $2\theta = 18.7 \pm 1°$ is 100 Å to 1200 Å and a crystallite size in the peak within $2\theta = 44.6 \pm 1°$ is 100 Å to 700 Å; and (3) in a pore distribution obtained by a mercury intrusion method, a pore peak exists in a range where the pore size is 10 nm to 200 nm and a pore volume in the said range is 0.01 cm³/g to 0.05 cm³/g.

According to an aspect of the present disclosure, it is desirable that the secondary particle size is 1 μm to 5 μm.

According to an aspect of the present disclosure, it is desirable that the BET specific surface area is 0.8 m²/g to 4 m²/g.

According to an aspect of the present disclosure, it is desirable that the positive electrode active material has a void in the particle.

According to an aspect of the present disclosure, it is desirable that the positive electrode active material is represented by $Li_aNi_xCo_yMn_zO_2$, where $0.9 \leq a \leq 1.2$, $0.3 < x < 1$, $0 \leq y < 0.4$, $0 < z < 0.4$, and $x+y+z=1$.

According to an aspect of the present disclosure, a positive electrode having the positive electrode active material described above is provided.

According to an aspect of the present disclosure, a lithium secondary battery having a negative electrode and the positive electrode described above is provided.

According to the present disclosure, it is possible to provide a positive electrode active material for a lithium secondary battery which is useful for a lithium secondary battery having a battery resistance lower than that of the prior art, in other words, higher power, below freezing point. Also it is possible to provide a positive electrode and a lithium secondary battery in which such a positive electrode active material for a lithium secondary battery is used.

DETAILED DESCRIPTION OF THE PREFERRED EMBODIMENT

[Positive Electrode Active Material for Lithium Secondary Battery]

A positive electrode active material for a lithium secondary battery according to the present embodiment is a positive electrode active material for a lithium secondary battery (hereinafter, also simply referred to as a "lithium metal composite oxide") that contains at least one element selected from a group consisting of nickel, cobalt and manganese, the positive electrode active material preferably having a layered structure that is represented by the general formula $Li_aM^1{}_sM^2{}_{1-s}O_2$, where $M^1$ represents an essential metal comprising one or more of Ni, Co and Mn, $M^2$ represents one or more optional metal among Fe, Cu, Ti, Mg, Al, W, Zn, Sn, Zr, Ga and V, "a" is $0.9 \le a \le 1.2$, and "s" is $0.9 \le s \le 1$, the positive electrode active material satisfying all of the following requirements (1) to (3):

(1) a primary particle size is greater than or equal to 0.1 μm and less than or equal to 1 μm and a secondary particle size is greater than or equal to 1 μm and less than or equal to 10 μm;

(2) in an X-ray powder diffraction measurement using CuKα radiation, a crystallite size in the peak within $2\theta=18.7\pm1°$ is 100 Å to 1200 Å and a crystallite size in the peak within $2\theta=44.6\pm1°$ is 100 Å to 700 Å; and (3) in a pore distribution obtained by a mercury intrusion method, a pore peak exists in a range where the pore size is 10 nm to 200 nm and a pore volume in the said range is 0.01 cm³/g to 0.05 cm³/g.

Hereinafter, this will be described in order.

To obtain a lithium secondary battery having a greater capacity, it is preferable that the positive electrode active material of the present disclosure is represented by the general formula $Li_aM^1{}_sM^2{}_{1-s}O_2$, where $M^1$ represents an essential metal comprising one or more of Ni, Co and Mn, $M^2$ represents one or more optional metal among Fe, Cu, Ti, Mg, Al, W, Zn, Sn, Zr, Ga and V, "a" is $0.9 \le a \le 1.2$, and "s" is $0.9 \le s \le 1$.

In order to obtain a lithium secondary battery having a greater capacity, it is more preferable that, regarding the positive electrode active material of the present disclosure, the aforementioned general formula is represented by $Li_aNi_xCo_yMn_zO_2$, where
$0.9 \le a \le 1.2$,
$0.3 < x < 1$,
$0 \le y < 0.4$,
$0 < z < 0.4$, and
$x+y+z=1$, and further preferably, $Li_aNi_{1/3}Co_{1/3}Mn_{1/3}O_2$, where
$0.9 \le a \le 1.2$.

(Layered Structure)

The crystal structure of the lithium metal composite oxide of the present embodiment is a layered structure, and it is more preferably a hexagonal crystal structure or a monoclinic crystal structure.

The hexagonal crystal structure belongs to one of the space groups selected from a group consisting of P3, P3$_1$, P3$_2$, R3, P-3, R-3, P312, P321, P3$_1$12, P3$_1$21, P3$_2$12, P3$_2$21, R32, P3m1, P31m, P3c1, P31c, R3m, R3c, P-31m, P-31c, P-3m1, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6mm, P6cc, P6$_3$cm, P6$_3$mc, P-6m2, P-6c2, P-62m, P-62c, P6/mmm, P6/mcc, P6$_3$/mcm and P6$_3$/mmc.

The monoclinic crystal structure belongs to one of the space groups selected from a group consisting of P2, P2$_1$, C2, Pm, Pc, Cm, Cc, P2/m, P2$_1$/m, C2/m, P2/c, P2$_1$/c and C2/c.

Among these, it is particularly preferable that the crystal structure of the positive electrode active material is a hexagonal crystal structure belonging to space group R-3m or a monoclinic crystal structure belonging to C2/m, since these provide a greater discharge capacity for the obtained lithium secondary battery.

The space group of the lithium metal composite oxide of the present embodiment can be identified as follows.

First, the positive electrode active material undergoes an X-ray powder diffraction measurement using Cu-Kα as a radiation source with a measuring range for a diffraction angle 2ζ being greater than or equal to 10° and less than or equal to 90°, and then, based on the result, a Rietveld analysis is carried out to determine the crystal structure of the lithium metal composite oxide and the space group of this crystal structure. Rietveld analysis is a technique in which data of a diffraction peak (diffraction peak intensity, diffraction angle 2θ) in the X-ray powder diffraction measurement of the material is used to analyze the crystal structure of the material, which is a conventionally used technique (e.g., The Japan Society for Analytical Chemistry, X-ray Analysis Research Council (Feb. 10, 2002). Funmatsu X-sen Kaiseki-no Jissai-Rietveld-hou Nyuumon [Facts of X-ray Powder Analysis—Introduction to the Rietveld Method].

(Particle Size)

The particle morphology of the positive electrode active material of the present disclosure may be secondary particles formed by aggregation of primary particles, or may be a mixture of primary particles and secondary particles formed by aggregation of primary particles. It is preferable that the primary particle of the present disclosure has a primary particle size of greater than or equal to 0.1 μm and less than or equal to 1 μm. It is preferable that the secondary particle formed by aggregation of the primary particles has a secondary particle size of greater than or equal to 1 μm and less than or equal to 10 μm. An average particle size of the primary particles can be measured by observation using a SEM. In order to increase an effect of the disclosure, it is preferable that the secondary particle size is greater than or equal to 1 μm and less than or equal to 5 μm.

In the present embodiment, the "secondary particle size" of the positive electrode active material means a value measured by a method described below (laser diffraction scattering method).

First, add 0.1 g positive electrode active material powder to 50 ml of 0.2 mass % aqueous solution of sodium hexametaphosphate to obtain a dispersion in which the powder is dispersed. Using Mastersizer 2000 (laser diffraction scattering particle size distribution measuring apparatus) manufactured by Malvern Instruments Ltd., a particle size distribution is measured for the obtained dispersion, and a volume-based cumulative particle size distribution curve is obtained. On the obtained cumulative particle size distribution curve, a value of the particle size for 50% accumulation from the microparticle side ($D_{50}$) was taken as a secondary particle size of the positive electrode active material.

(Crystallite Size)

An X-ray powder diffraction measurement using a CuKα radiation for the lithium metal composite oxide of the present embodiment indicated that a crystallite size for a peak within a range of $2\theta=18.7\pm1°$ (hereinafter, also referred to as peak A) is 100 Å to 1200 Å, and a crystallite size for a peak within a range of $2\theta=44.6\pm1°$ (hereinafter, also referred to as peak B) is 100 Å to 700 Å. The crystallite size for peak A is preferably 300 Å to 1100 Å, and more preferably 500 Å to 1000 Å. The crystallite size for peak B is preferably 150 Å to 650 Å, and more preferably 200 Å to 600 Å. Any combinations of the preferred crystallite sizes for peak A and the crystallite sizes for peak B are possible.

Thereby, there is an effect that a cycle property of the obtained lithium secondary battery becomes good.

In the present embodiment, the crystallite size for peak A and the crystallite size for peak B of the positive electrode active material can be determined as described below.

First, the positive electrode active material undergoes an X-ray powder diffraction measurement using Cu-Kα as a radiation source with a measuring range for a diffraction angle 2θ being greater than or equal to 10° and less than or equal to 90°, and peaks corresponding to peak A and peak B are determined. Further, a full width half maximum for the determined respective peaks are calculated, and by using a Scherrer-equation $D=K\lambda/B\cos\theta$ (D: crystallite size, K: Scherrer constant, B: peak line width), a crystallite size can be calculated. It is a conventionally used method to calculate the crystallite size by the equation indicated above (e.g., see WASEDA, Yoshio & MATSUBARA, Eiichiro (third edition, Apr. 30, 2002). X-sen Kouzou Kaiseki-Genshi-no Hairetsu-o Kimeru—[X-ray Structural Analysis—Determining an Arrangement of Atoms-]. Tokyo, Japan: Uchida Rokakuho Publishing.

(Pore Distribution by Mercury Intrusion Method)

On a pore distribution of the positive electrode active material of the present embodiment obtained by a mercury intrusion method, there is a pore peak for a pore size in a range of 10 nm to 200 nm, and in this range, the pore volume is 0.01 cm$^3$/g to 0.05 cm$^3$/g. Above an upper limit of this range, a fill factor when made into an electrode will decrease, and will cause a decrease in battery capacity. On the other hand, below a lower limit of this range, a contact interface between the positive electrode active material and the electrolytic solution will decrease, and will causes an increase in battery resistance and a decrease in output characteristics. Further, in a range of 10 nm to 200 nm, a pore size indicating a maximum differential volume is preferably 10 nm to 200 nm, and more preferably 20 nm to 180 nm, and further preferably 30 nm to 150 nm.

In the present embodiment, the pore size in the pore distribution of the positive electrode active material can be obtained by a method as described below.

First, a container containing a sample is evacuated, and thereafter mercury is filled in the container. Since mercury has a high surface tension, mercury does not intrude into pores in a surface of the sample without any change, but when a pressure is applied on mercury and the pressure is gradually increased, mercury gradually intrudes into pores starting from pores having larger diameters to pores having smaller diameters. By detecting an amount of mercury intruded into the pores while continuously increasing the pressure, a mercury intrusion curve can be obtained from the relationship between the pressure applied to mercury and the amount of intruded mercury. Here, assuming that a pore has a cylindrical shape, a pore size is represented by:

$$D=-4\sigma\times\cos\theta/P,$$

where P is pressure applied to mercury, D is a pore size (pore diameter), σ is surface tension of mercury, and θ is a contact angle between mercury and the sample.

That is, since there is a correlation between the pressure P applied to mercury and the diameter D of the pore into which mercury intrudes, a pore distribution curve representing the relationship between the size of the pore diameter of the sample and the volume thereof can be obtained based on the obtained mercury intrusion curve. Note that, approximate measurement limits of the pore size by the mercury intrusion method are a lower limit of greater than or equal to approximately 2 nm and an upper limit of less than or equal to approximately 200 μm. Measurement by a mercury intrusion method can be performed using an apparatus such as a mercury porosimeter. A specific example of a mercury porosimeter may be Auto Pore III9420 (manufactured by Micromeritics Instrument Corporation).

(BET Specific Surface Area)

It is preferable that the positive electrode active material of the present embodiment has a BET specific surface area of greater than or equal to 4 m$^2$/g and less than or equal to 0.8 m$^2$/g. Thus, a battery resistance of the obtained lithium secondary battery at a low temperature decreases. In order to increase an effect of the present disclosure, it is preferable that the BET specific surface area of the lithium metal composite oxide is greater than or equal to 1 m$^2$/g. Considering the fill factor, it is preferable that the preferred BET specific surface area is less than or equal to 3 m$^2$/g.

(Void in Secondary Particle)

It is preferable that the positive electrode active material of the present embodiment includes a secondary particle having a void therein. A void is a space having a diameter greater than or equal to 50 nm that exists inside a positive electrode active material particle and observed in a cross section of the particle. It is preferable that a single particle has two or more voids, and more particularly, five or more, and further preferably, ten or more. Thus, a discharge capacity of the obtained lithium secondary battery at a high current rate increases. Also, the diameter of the void is preferably greater than or equal to 60 nm and less than or equal to 1000 nm, more preferably greater than or equal to 70 nm and less than or equal to 800 nm, and further preferably greater than or equal to 75 nm and less than or equal to 600 nm. Thus, an electrode using the positive electrode active material particle has an increased density, and a high capacity lithium secondary battery can be obtained.

An exemplary measuring method of the void will be described below.

Positive electrode active material particles to be measured are dispersed in an epoxy resin and solidified. This epoxy resin is subjected to cross-section processing by an Ar ion milling method using Ilion manufactured by Gatan Inc. and, SEM observation is carried out on the processed sample by irradiating an electron beam at an accelerating voltage of 2 kV using S-4800 manufactured by Hitachi High-Technologies Corporation. After extracting a particle at random from an image (SEM image) obtained by SEM observation, a space inside the particle is measured using parallel lines extending in a certain direction such that a projection image of the space is placed between the parallel lines, and taking a distance between the parallel lines (Feret's diameter) as a diameter of the space. When the diameter is greater than or equal to 50 nm, it is regarded as a void.

Further, it is preferable that the positive electrode active material of the present embodiment includes 20% or more secondary particles having a void inside thereof, more preferably, 50% or more, and further preferably, 80% or more. The percentage of the secondary particles having a void inside thereof is defined as 20% or more, for a case where 20 or more secondary particles having a void inside thereof are included with respect to 100 secondary particles, for example. Thus, a liquid retention amount of an electrode using the positive electrode active material particles increases, and a lithium secondary battery having a high cycle property is obtained.

[Method of Producing Lithium Metal Composite Oxide]

When producing a lithium metal composite oxide of the present disclosure, first, it is preferable to prepare a metal composite compound including metals other than lithium, that is, at least one essential metal selected from a group consisting of Ni, Co and Mn, and one or more optional metal among Fe, Cu, Ti, Mg, Al, W, Zn, Sn, Zr, Ga and V, and to bake the metal composite compound with an appropriate lithium salt. The metal composite compound is preferably a metal composite hydroxide or a metal composite oxide. Hereinafter, an exemplary method of producing a positive electrode active material will be described in separate sections for a metal composite compound producing step and a lithium metal composite oxide producing step.

(Metal Composite Compound Producing Step)

A metal composite compound can be produced by a batch method or a coprecipitation method which are commonly known. Hereinafter, a metal composite hydroxide containing nickel, cobalt and manganese as metals is taken an example, a method of producing thereof will be described in detail.

First, by a coprecipitation method, particularly a continuous process described in Japanese Laid-Open Patent Publication No. 2002-201028, a nickel salt solution, a cobalt salt solution, a manganese salt solution and a complexing agent are reacted to produce a composite metal hydroxide represented by $Ni_xCo_yMn_z (OH)_2$, where $x+y+z=1$.

Nickel salts used as a solute of the abovementioned nickel salt solution include, for example, any of nickel sulfate, nickel nitrate, nickel chloride and nickel acetate, but not particularly limited thereto. Cobalt salts used as a solute of the cobalt salt solution includes, for example, any of cobalt sulfate, cobalt nitrate and cobalt chloride. Manganese salts used as a solute of the manganese salt solution include, for example, any of manganese sulphate, manganese nitrate and manganese chloride. The metal salts described above are used at a ratio corresponding to the aforementioned composition ratio of $Ni_xCo_yMn_z (OH)_2$. Water is used as a solvent.

The complexing agent is capable of forming a complex with ions of nickel, cobalt and manganese in an aqueous solution, and may be, for example, an ammonium ion supplier (ammonium sulfate, ammonium chloride, ammonium carbonate, ammonium fluoride, etc.), hydrazine, ethylenediaminetetraacetic acid, nitrilotriacetic acid, uracil diacetic acid and glycine.

As to precipitation, alkali metal hydroxide (e.g., sodium hydroxide, potassium hydroxide) is added, if necessary, to adjust the pH value of the aqueous solution.

In addition to the above-mentioned nickel salt solution, a cobalt salt solution and a manganese salt solution, when a complexing agent is continuously supplied to a reaction tank, nickel, cobalt and manganese react and $Ni_xCo_yMn_z (OH)_2$ is produced. As to the reaction, the temperature of the reaction tank is controlled to be, for example, greater than or equal to 10° C. and less than or equal to 60° C., and preferably in a range of 20° C. to 60° C., and the pH value in the reaction tank is controlled to be, for example, greater than or equal to pH 9 and less than or equal to pH 13, and preferably within a range of pH 11 to 13, and the material in the reaction tank is stirred as appropriate. The reaction tank is of a type which causes the formed reaction precipitation to overflow for separation.

After the above-mentioned reaction, the obtained reaction precipitation is cleaned with water, and thereafter dried to isolate nickel cobalt manganese hydroxide as the nickel cobalt manganese composite compound. Also, it may be cleaned with weakly acidic water as needed. Note that, in the above example, nickel cobalt manganese composite hydroxide is produced, but nickel cobalt manganese composite oxide may be prepared.

By appropriately controlling the concentration of the metal salt to be supplied to the reaction tank, the stirring rate, the reaction temperature, the reaction pH, and the baking conditions described below, it is possible to control various physical properties of the lithium metal composite oxide that is finally obtained in the follow step, the physical properties may be, for example, the primary particle size, the secondary particle size, the size of each crystallite, and the BET specific surface area. Further, in order to obtain a desired pore distribution or voids, bubbling by various gases, e.g., an inert gas such as nitrogen, argon and carbon dioxide, air, and oxygen, may be performed in parallel, in addition to the controlling of the aforementioned conditions. Since the reaction conditions also depend on the size of the reaction tank used, the reaction conditions are only to be optimized while monitoring various physical properties of the finally obtained lithium composite oxide.

(Lithium Metal Composite Oxide Producing Step)

The aforementioned metal composite oxide or hydroxide is dried and thereafter mixed with a lithium salt. The drying condition is not particularly limited, and may be, for example, any of the conditions including: a condition in which the metal composite oxide or hydroxide is neither oxidized nor reduced (oxide→oxide, hydroxide→hydroxide); a condition in which the metal composite hydroxide is oxidized (hydroxide→oxide); and a condition in which the metal composite oxide is reduced (oxide→hydroxide). For the condition in which there is no oxidation or reduction, an inert gas such as a rare-gas such as nitrogen, helium and argon may be used, and for the condition in which a hydroxide is oxidized, it may be performed under the atmosphere of oxygen or air. For the condition in which metal complex oxide is reduced, a reducing agent such as hydrazine and sodium sulfite may be used under an inert gas atmosphere. The lithium salt may be any one of or a mixture of two or more of lithium carbonate, lithium nitrate, lithium acetate, lithium hydroxide, lithium hydroxide hydrate, and lithium oxide. After drying the metal composite oxide or the hydroxide, it may be classified as appropriate. The abovementioned lithium salt and metal composite hydroxide are used while taking a composition ratio of an objective substance into consideration. For example, when using a nickel cobalt manganese composite hydroxide, the lithium salt and the metal composite hydroxide are used at a proportion corresponding to the composition ratio of $LiNi_xCo_yMn_zO_2$, where $x+y+z=1$. By baking the mixture of nickel cobalt manganese metal composite hydroxide and lithium salt, a lithium-nickel cobalt manganese composite oxide is obtained. Note that, baking is performed using dry air, oxygen atmosphere, inert atmosphere, or the like depending on the desired composition, and, if necessary, a plurality of heating steps are performed.

The baking temperature for the aforementioned metal composite oxide or hydroxide and lithium compounds such as lithium hydroxide and lithium carbonate is preferably greater than or equal to 850° C. and less than or equal to 1100° C., more preferably greater than or equal to 850° C. and less than or equal to 1050° C., and still more preferably 850° C. to 1025° C., but not particularly limited thereto. The baking temperature below 850° C. is likely to cause a problem of a decrease in an energy density (discharge capacity) and a high rate discharge performance. Below the aforementioned regions, there is a possibility that a structural factor disturbing the movement of Li is inherent.

On the other hand, the baking temperature higher than 1100° C. is likely to cause a production problem such as a difficulty in obtaining a composite oxide having a target composition due to volatilization of Li, and a problem that battery characteristics decrease due to densification of the particles. This is due to the fact that, above 1100° C., a primary particle growth rate increases and crystal particles of the composite oxide becomes too large, and in addition, it is assumed that this could be due to the fact that an amount of Li vacancy has increased locally and thus became structurally unstable. Further, as the temperature becomes higher, element substitution between sites occupied by Li elements and sites occupied by the transition metal elements occurs intensely and suppresses a Li conducting path, thus decreases the discharge capacity. With the baking temperature greater than or equal to 850° C. and less than or equal to 1025° C., it is possible to manufacture a battery having a particularly high energy density (discharge capacity) and a good discharge/recharge cycle performance. The baking time is preferably 3 hours to 50 hours. The baking time of over 50 hours is not problematic in respect to the battery performance, but due to volatilization of Li, the battery characteristics tends to be substantially inferior. The baking time of less than three hours will result in a poor crystalline development, and tends to give a poor battery characteristics. Note that, it is effective to perform pre-baking prior to baking. Pre-baking is preferably performed at a temperature in a range of 300° C. to 850° C. for 1 to 10 hours.

The lithium metal composite oxide obtained by baking is ground and thereafter classified as appropriate to provide a positive electrode active material which is applicable to lithium secondary batteries.

[Lithium Secondary Battery]

The configuration of a lithium secondary battery will be described below, and further, a positive electrode in which the lithium metal composite oxide of the present embodiment is employed as a positive electrode active material of the lithium secondary battery and a lithium secondary battery having such a positive electrode will be described.

An exemplary lithium secondary battery of the present embodiment has a positive electrode, a negative electrode, a separator held between the positive electrode and the negative electrode, and an electrolytic solution disposed between the positive electrode and the negative electrode.

Figure 1A:
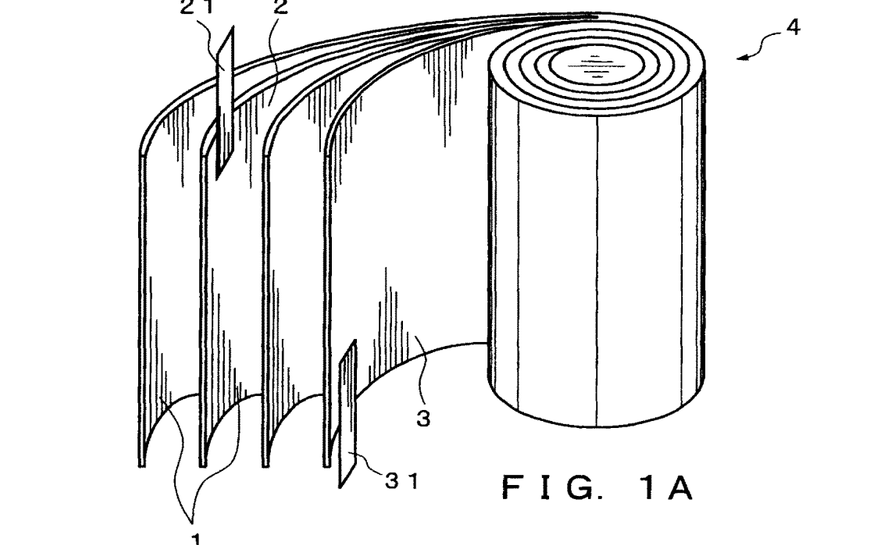
FIGS. 1A and 1B are schematic configuration diagrams showing an exemplary lithium ion secondary battery.
Figure 1B:
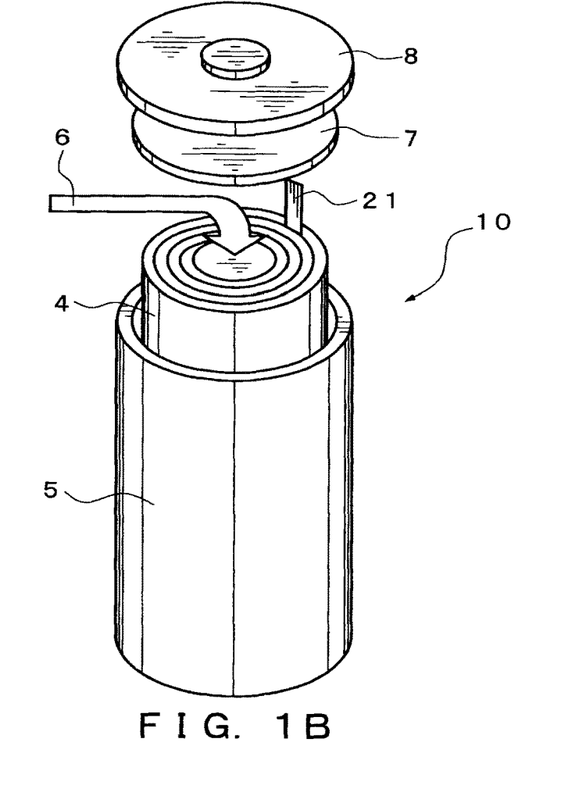

FIGS. 1A and 1B are schematic configuration diagrams showing an example of a lithium ion secondary battery of the present embodiment. A cylindrical lithium secondary battery 10 of the present embodiment is manufactured as described below.

First, as shown in FIG. 1A, a pair of separators 1 having a belt shape, a belt-shaped positive electrode 2 having a positive electrode lead 21 at one end, and a belt-shaped negative electrode 3 having a negative electrode lead 31 at one end are layered in order of the separator 1, the positive electrode 2, the separator 1 and the negative electrode 3 and wound into an electrode group 4.

Then, as shown in FIG. 1B, after having accommodated the electrode group 4 and an insulator, not shown, in a battery can 5, a bottom of the can is sealed and an electrolytic solution 6 is impregnated to the electrode group 4, and an electrolyte is disposed between the positive electrode 2 and the negative electrode 3. Further, an upper part of the battery can 5 is sealed with a top insulator 7 and a sealing 8 to thereby manufacture the lithium secondary battery 10.

The shape of the electrode group 4 may be, for example, columnar shapes with the cross sectional shape of the electrode group 4 when cut in a direction perpendicular to an axis of winding being circular, elliptical, rectangular, or a rectangular shape having rounded corners.

The shape of the lithium secondary battery having such an electrode group 4 may be a shape conforming to IEC 60086, which is a standard of batteries established by the International Electrotechnical Commission (IEC) or JIS C 8500. For example, the shape may be a cylindrical shape or a rectangular shape.

Further, the lithium secondary battery is not limited to the aforementioned wound-up type but may be of a stacked configuration in which a layered structure of a positive electrode, a separator, a negative electrode, and a separator is repeatedly stacked. The lithium secondary battery of the stacked type is, for example, a so-called coin type battery, a button type battery, a paper type (or a sheet type) battery.

Hereinafter, the features will be described individually.

(Positive Electrode)

The positive electrode of the present embodiment can be manufactured by first preparing a positive electrode mixture including a positive electrode active material, an electrically-conductive material and a binder, and supporting the positive electrode mixture with a positive electrode collector.

(Electrically-Conductive Material)

The electrically-conductive material in the positive electrode of the present embodiment may be a carbon material. The carbon material may be, for example, graphite powder, carbon black (e.g., acetylene black), and a carbon fiber material. Since carbon black is particulate and has a large surface area, adding a small amount of carbon black into the positive electrode mixture causes an increase in conductivity and improvements in discharge-charge efficiency and output characteristics. However, when carbon black is added in excess, both a binding force between the positive electrode mixture and the positive electrode collector and a binding force internally of the positive electrode mixture caused by the binder decrease, which would result in an increase in internal resistance.

It is preferable that the ratio of the electrically-conductive material in the positive electrode mixture is greater than or equal to 5 parts by mass and less than or equal to 20 parts by mass with respect to 100 parts by mass positive electrode active material. In a case where a carbon fiber material such as graphitized carbon fiber or carbon nano-tubes is used as an electrically-conductive material, this ratio may be decreased.

(Binder)

The binder of the positive electrode of the present embodiment may be a thermoplastic resin. The thermoplastic resin may be a fluorine resin such as a polyvinylidene fluoride (hereinafter also referred to as PVdF), polytetrafluoroethylene (hereinafter also referred to as PTFE), tetrafluoroethylene hexafluoropropylene vinylidene fluoride copolymer, hexafluoropropylene vinylidene fluoride copolymer, tetrafluoroethylene perfluorovinyl ether copolymer; a polyolefin resin such as polyethylene and polypropylene.

Two or more of the aforementioned thermoplastic resins may be mixed and used. By using a fluorine resin and a polyolefin resin as a binder, and with the ratio of the fluorine resin being greater than or equal to 1 mass % and less than or equal to 10 mass %, and a ratio of the polyolefin resin being greater than or equal to 0.1 mass % and less than or equal to 2 mass % with respect to an entirety of the positive electrode mixture, a positive electrode mixture having a high binding force with the positive electrode collector as well as a high binding force internally of the positive electrode mixture can be obtained.

(Positive Electrode Collector)

The positive electrode collector of the positive electrode of the present embodiment may be a belt-shaped member made of a material such as a metal material such as Al, Ni, and stainless steel. Specifically, considering the ease of processing and inexpensiveness, it is preferable to use Al as a material and process it into a thin film.

The method of causing the positive electrode collector to support the positive electrode mixture includes a method of pressure molding the positive electrode mixture on the positive electrode collector. Alternatively, the positive electrode mixture may be supported by the positive electrode collector by preparing a paste of positive electrode mixture using an organic solvent, applying the obtained paste of positive electrode mixture on at least one side of the positive electrode collector, and then drying and pressing to fix it.

When making a paste of positive electrode mixture, an organic solvent which can be used includes: an amine-based solvent such as N, N-dimethylaminopropylamine and diethylenetriamine; an ether-based solvent such as tetrahydrofuran; a ketone-based solvent such as methyl ethyl ketone; an ester-based solvent such as methyl acetate; and an amide-based solvent such as dimethyl acetamide and N-methyl-2-pyrrolidone (hereinafter also referred to as NMP).

The method of applying the paste of positive electrode mixture to the positive electrode collector includes, for example, a slit die coating method, a screen coating method, a curtain coating method, a knife coating method, a gravure coating method and an electrostatic spray method.

The positive electrode can be produced by the methods mentioned above.

(Negative Electrode)

The negative electrode of a lithium secondary battery of the present embodiment only need to be capable of being doped or undoped with lithium ions at a potential lower than that of the positive electrode, and may be an electrode comprising a negative electrode mixture including the negative electrode active material supported by the negative electrode collector or an electrode comprising a negative electrode active material alone.

(Negative Electrode Active Material)

The negative electrode active material of the negative electrode may be a carbon material, chalcogenide (oxide, sulfide, etc.), nitride, or a material which is a metal or an alloy that is capable of being doped or undoped with lithium ions at a potential lower than that of the positive electrode.

Carbon materials that can be used as a negative electrode active material include natural graphite, graphite such as an artificial graphite, coke, carbon black, pyrolytic carbons, carbon fiber and a baked organic polymer compound.

The oxides which can be used as the negative electrode active material include oxides of silicon represented by the formula $SiO_x$ (here, x is a positive real number) such as $SiO_2$ and including SiO; oxides of titanium represented by the formula $TiO_x$ (here, x is a positive real number) such as $TiO_2$ and TiO; oxides of vanadium represented by the formula $VO_x$ (here, x is a positive real number) such as $V_2O_5$ and $VO_2$; oxides of iron represented by the formula $FeO_x$ (here, x is a positive real number) such as $Fe_3O_4$, $Fe_2O_3$ and FeO; oxides of tin represented by the formula $SnO_x$ (here, x is as positive real number) such as $SnO_2$ and SnO; oxides of tungsten represented by the general formula $WO_x$ (here, x is a positive real number) such as $WO_3$ and $WO_2$; a composite metal oxides containing lithium and either titanium or vanadium such as $Li_4Ti_5O_{12}$, such as $LiVO_2$.

Sulfides which can be used as a negative electrode active material include sulfides of titanium represented by the formula $TiS_x$ (here, x is a positive real number) such as $Ti_2S_3$, $TiS_2$ and TiS; sulfides of vanadium represented by the formula $VS_x$ (here, x is a positive real number) such as $V_3S_4$, $VS_2$, and VS; sulfides of iron represented by the formula $FeS_x$ (here, x is a positive real number) such as $Fe_3S_4$, $FeS_2$ and FeS; sulfides of molybdenum represented by the formula $MoS_x$ (here, x is a positive real number) such as $Mo_2S_3$ and $M_oS_2$; sulfide of tin represented by the formula $SnS_x$ (here, x is a positive real number) such as $SnS_2$ and SnS; sulfides of tungsten represented by the formula $WS_x$ (here, x is a positive real number) such as $WS_2$; antimonial sulfide represented by the formula $SbS_x$ (here, x is a positive real number) such as $Sb_2S_3$; and sulfides of selenium represented by the formula $SeS_x$ (here, x is a positive real number) such as $Se_5S_3$, $SeS_2$ and SeS.

Nitrides which can be used as the negative electrode active material include lithium-containing nitride such as $Li_3N$, $Li_{3-x}A_xN$ (here, A is either or both of Ni and Co, and $0<x<3$).

Among the aforementioned carbon materials, oxides, sulfides, and nitrides, only one may be used or two or more may be used together. Further, these carbon materials, oxides, sulfides and nitrides may be either crystalline or amorphous.

Metals which can be used the negative electrode active material include lithium metals, silicon metals and tin metals.

Alloys which can be used as the negative electrode active material include lithium alloys such as Li—Al, Li—Ni, Li—Si, Li—Sn and Li—Sn—Ni; silicon alloys such as Si—Zn; and tin alloys such as Sn—Mn, Sn—Co, Sn—Ni, Sn—Cu and Sn—La; and alloys such as $Cu_2Sb$ and $La_3Ni_2Sn_7$.

These metals or alloys are mainly used alone as an electrode after being processed into a foil form, for example.

Among the negative electrode active materials, carbon materials composed primarily of graphite such as natural graphite and artificial graphite are preferable, since there is almost no change in the potential of the negative electrode from an uncharged state to a fully charged state during the charging (potential flatness is good); an average discharge potential is low; and a capacity ratio after a repeated charging and discharging is high (cycle property is good). The shape of the carbon material may be any of a flaky shape such as natural graphite, a spherical shape such as Meso-Carbon MicroBeads, a fibrous shape such as graphitized carbon fiber or an agglomerate of fine powder.

The aforementioned negative electrode mixture may contain binder as needed. The binder may be a thermoplastic resin, and specifically may be PVdF, thermoplastic polyimide, carboxymethyl cellulose, polyethylene and polypropylene.

(Negative Electrode Collector)

The negative electrode collector of the negative electrode may be a belt-shaped member including a formation material that is a metal material such as Cu, Ni, and stainless steel. Specifically, a member made of Cu and processed into a thin film is preferable since it does not easily form an alloy with lithium and can be easily processed.

The method of causing the negative electrode collector to support the negative electrode mixture includes, similarly to the case of the positive electrode, a method of pressure molding, or by making a paste using a solvent or the like, applying it on the negative electrode collector, drying and thereafter pressing and pressure bonding.

(Separator)

The separator of the lithium secondary battery of the present embodiment may be a material comprising, for example, a polyolefin resin such as polyethylene and polypropylene, a fluorine resin, and a nitrogen-containing aromatic copolymer and configured as a porous film, a nonwoven fabric or a woven fabric. Also, two or more of these materials may be used to form a separator, or these materials may be layered to form a separator.

The separator may be separators, for example, described in Japanese Laid-Open Patent Publication Nos. 2000-30686 and H10-324758. As far as the mechanical strength is maintained, it is preferable that the thickness of the separator is small, since a smaller thickness provides an increase in a volume energy density of the battery and a decrease in an internal resistance, and it is preferably about 5 µm to 200 µm, and more preferably about 5 µm to 40 µm.

The separator preferably has a porous film containing a thermoplastic resin. It is preferable that the lithium secondary battery has a function of blocking (shutting down) an excessiveness electric current by breaking the electric current at the short circuit point for a case in which an abnormal electric current has flowed in the battery due to short circuit between the positive electrode and the negative electrode. In a case where the separator at a short circuit point is overheated due to a short circuit and has exceeded a working temperature which had been assumed in advance, the porous film in the separator softens or melts to block the micropores to perform a shutdown. It is desirable that the separator maintains a shutdown state without the rupture of the film, even if the temperature in the battery increases to a certain elevated temperature after the shut down.

Such a separator may be a laminated film in which a heat resistant porous layer and a porous film are laminated. By using such a laminated film as a separator, heat resistance of the secondary battery in the present embodiment can be further improved. As for the laminated film, the heat resistant porous layer may be laminated on both sides of the porous film.

(Laminated Film)

The laminated film in which the heat resistant porous layer and porous film are laminated with each other will be described below.

In the laminated film used as a separator of the lithium secondary battery of the present embodiment, the heat resistant porous layer is a layer having a heat resistant higher than that of the porous film. The heat resistant porous layer may be formed of an inorganic powder (a first heat resistant porous layer), may be formed of a heat resistant resin (a second heat resistant porous layer), or may be formed to include a heat resistant resin and a filler (a third heat resistant porous layer). Since the heat resistant porous layer contains a heat resistant resin, the heat resistant porous layer can be formed by a simple technique such as coating.

(First Heat Resistant Porous Layer)

In a case where the heat resistant porous layer is formed of inorganic powder, the inorganic powder used for the heat resistant porous layer includes, for example, powder comprising an inorganic substance such as metal oxide, metal nitride, metal carbide, metal hydroxide, carbonate and sulfate, and among the above, it is preferable to use powder comprising an (insulating) inorganic substance having a low conductivity. Exemplifying more specifically, the powder may include alumina, silica, titanium dioxide, calcium carbonate and the like. Such inorganic powder may be used either alone or as a mixture of two or more.

Because of a high chemical stability, alumina powder is preferable among the aforementioned inorganic powders. Also, it is more preferable that all particles constituting the inorganic powder are alumina particles, and it is further preferable that all particles constituting the inorganic powder are alumina particles and that some or all of them are generally spherical alumina particles.

(Second Heat Resistant Porous Layer)

In a case where the heat resistant porous layer is formed of a heat resistant resin, the heat resistant resin used for the heat resistant porous layer may be polyamide, polyimide, polyamide-imide, polycarbonate, polyacetal, polysulfone, polyphenylene sulfide, polyether ketone, aromatic polyester, polyethersulfone or polyetherimide. In order to further improve the heat resistance of the laminated film, polyamide, polyimide, polyamide-imide, polyethersulfone and polyetherimide are preferable, and polyamide, polyimide or polyamide-imide are more preferable.

The heat resistant resin used for the heat resistant porous layer is more preferably a nitrogen-containing aromatic copolymer such as aromatic polyamide (para-orientation aromatic polyamide or meta-orientation aromatic polyamide), aromatic polyimide, aromatic polyamide-imide, and preferred among other things is aromatic polyamide, and particularly preferable for ease of production is para-orientation aromatic polyamide (hereinafter also referred to as para-aramid).

Also, the heat resistant resin may be poly-4-methyl pentene-1 or cyclic olefin polymers.

By using the aforementioned heat resistant resin, the heat resistance of a laminated film used as a separator of the lithium secondary battery, namely the thermal film rupture temperature of the laminated film can be further increased. Among these heat resistant resin, when using a nitrogen-containing aromatic copolymer, there is a case where compatibility between the nitrogen-containing aromatic copolymer and the electrolytic solution, namely a liquid retaining property in the heat resistant porous layer, also improves, probably because of the polarity in the molecules of the nitrogen-containing aromatic copolymer. In such a case, the rate of impregnation of the electrolytic solution during the manufacture of the lithium secondary battery is high, and the discharge and charge capacity of the lithium secondary battery further increases.

The thermal film rupture temperature of such a laminated film depends on the type of heat resistant resin, and is selected and used depending on where to use and the purpose of use. More specifically, the thermal film rupture temperature may be controlled to be around 400° C. when the aforementioned nitrogen-containing aromatic copolymer is used as the heat resistant resin, around 250° C. when polypotomy-4-methyl pentene-1 is used, and around 300° C. when cyclic olefin polymer is used, respectively. Also, in a case where the heat resistant porous layer comprises inorganic powder, the thermal film rupture temperature can be controlled to be, for example, 500° C.

The para-aramid is obtained by condensation polymerization of para-orientation aromatic diamine and para-orientation aromatic dicarboxylic acid halide, and consists substantially of repeat units whereto amide bonds are bonded at a para position or correspondingly oriented positions of an aromatic ring (e.g., positions oriented to extend coaxially or in parallel in opposite directions such as 4,4'-biphenylene, 1,5-naphthalene, and 2,6-naphthalene). Specifically, para-aramids having a para-oriented structure type or a structure corresponding to a para-oriented type such as poly(paraphenyleneterephthalamide), poly (parabenz-amide), poly(4,4'-benzanilideterephthalamide), poly (para-phenylene-4,4'-biphenylenedicarboxylic acid amide), poly (para-phenylene-2,6-naphthalenedicarboxylic acid amide), poly (2-chloropara phenylene terephthalamide), and paraphenyleneterephthalamide/2,6-dichloroparaphenylene-terephthalamide copolymers are exemplified.

The aromatic polyimide is preferably a fully aromatic polyimide produced by condensation polymerization of polymerization of aromatic dianhydride and diamine.

Specifically, the dianhydride used in condensation polymerization may include pyromelletic dianhydride, 3,3',4,4'-diphenylsulfonetetracarboxylic dianhydride, 3,3',4,4'-benzophenonetetracarboxylic dianhydride, 2,2'-bis (3,4-dicarboxyphenyl) hexafluoropropane or 3,3',4,4'-biphenyltetracarboxylic dianhydride.

Specifically, the diamine used in condensation polymerization may include oxydianiline, paraphenylendiamine, benzophenone diamine, 3,3'-methylenedianiline, 3,3'-diaminobenzophenone, 3,3'-diaminodiphenyl sulfone or 1,5-naphthalenediamine.

Preferably, a polyimide that is soluble to a solvent can be used as the aromatic polyimide. Such polyimide may be, for example, a polyimide which is a polycondensate of 3,3',4,4'-diphenylsulfone tetracarboxylic dianhydride and an aromatic diamine.

The aforementioned aromatic polyamideimide may include an aromatic polyamideimide obtained by condensation polymerization of aromatic dicarboxylic acid and aromatic diisocyanate or an aromatic polyamideimide obtained by condensation polymerization of aromatic dicarboxylic acid and aromatic diisocyanate. Specifically, the aromatic dicarboxylic acid may include isophthalic acid and terephthalic acid. Further, specifically, the aromatic diacid anhydride may include anhydrous trimellitic acid. Specifically, the aromatic diisocyanate may include 4,4'-diphenylmethane diisocyanate, 2,4-tolylene diisocyanate, 2,6-tolylene diisocyanate, ortho-tolylene diisocyanate and m-xylene diisocyanate.

Also, in order to further improve ion permeability, a thin heat resistant porous layer is preferable in which the heat resistant porous layer in a laminated film has a thickness of greater than or equal to 1 μm and less than or equal to 10 μm, more preferably greater than or equal to 1 μm and less than or equal to 5 μm, and particularly preferably in greater than or equal to 1 μm and less than or equal to 4 μm. Also, the heat resistant porous layer has micropores, and the size (diameter) of the hole is preferably less than or equal to 3 μm and more preferably less than or equal to 1 μm.

(Third Heat Resistant Porous Layer)

In a case where the heat resistant porous layer comprises a heat resistant resin and a filler, the heat resistant resin may be the same as the one used for the above-mentioned second heat resistant porous layer. The filler may be one or more selected from a group consisting of organic powder, inorganic powder and a mixture thereof. It is preferable that particles constituting the filler has an average particle size of greater than or equal to 0.01 μm and less than or equal to 1 μm.

The organic powder which can be used as a filler is, for example, powder of an organic material such as: a polymer of styrene, vinyl ketone, acrylonitrile, methyl methacrylate, ethyl methacrylate, glycidyl methacrylate, glycidyl acrylate or methyl acrylate as a homopolymer, or in combination of two or more kinds of these as a copolymer; a fluorine-based resin such as PTFE, 4 ethylene fluoride-6 fluorinated propylene copolymer, 4 ethylene fluoride-ethylene copolymer, or polyvinylidene fluoride; melamine resin; urea resin; polyolefin resin; and polymethacrylate. Such an organic powder may be used alone or as a mixture of two or more can be mixed and used. Among these organic powders, PTFE powder is preferable because of a high chemical stability.

As an inorganic powder which can be used as a filler, the powders which are the same as the inorganic powders used for the heat resistant porous layer can be exemplified.

In a case where the heat resistant porous layer includes the heat resistant resin and the filler, the content of the filler is, although it depends on relative density of the material of the filler, for example, when all of the particles constituting the filler are alumina particles, taking the gross mass of the heat resistant porous layer as 100 parts by mass, the mass of the filler is preferably greater than or equal to 5 parts by mass and less than or equal to 95 parts by mass, more preferably greater than or equal to 20 parts by mass and less than or equal to 95 parts by mass, and further preferably greater than or equal to 30 parts by mass and less than or equal to 90 parts by mass. These ranges can be set as appropriate depending on the relative density of the material of the filler.

The shape of the filler may be shapes such as a generally spherical shape, a planar shape, a columnar shape, a needle shape, and a fibrous shape, and any of these particles can be used, and it is preferable to use generally spherical particles, because uniform holes can be formed easily. The generally spherical particles include particles having an aspect ratio (larger diameter/shorter diameter) of the particle of greater than or equal to 1 and less than or equal to 1.5. The aspect ratio of the particle can be measured using an electron micrograph.

Preferably, the porous film in the laminated film used as the separator of the lithium secondary battery of the present embodiment has micropores and has a shutdown function. In this case, the porous film contains a thermoplastic resin.

The micropore in the porous film has a size of preferably less than or equal to 3 μm, and more preferably, less than or equal to 1 μm. The porous film has a porosity of preferably greater than or equal to 30 volume % and less than or equal to 80 volume %, and more preferably greater than or equal to 40 volume % and less than or equal to 70 volume %. In the lithium secondary battery, in a case where the working temperature assumed in advance is exceeded, the porous film containing the thermoplastic resin is capable of blocking the micropores as a result of the softening or fusing of the thermoplastic resin included in the porous film.

The thermoplastic resin used for the porous film is selected as the one that does not dissolve in the electrolytic solution in the lithium secondary battery. Specifically, the thermoplastic resin may be a polyolefin resin such as polyethylene and polypropylene and a thermoplastic polyurethane resin, and a mixture of two or more of them may be used.

In order to cause the separator to soften and shut down at a lower temperature, it is preferable that the porous film contains polyethylene. Polyethylene may be polyethylene such as low density polyethylene, high density polyethylene, and linear polyethylene, and may also include an ultra-high-molecular-weight polyethylene having a molecular mass of greater than or equal to 1 million.

In order to further improve a puncture strength of the porous film, it is preferable that the thermoplastic resin included in the porous film at least contains ultra-high-molecular-weight polyethylene. In manufacturing the porous film, there may be a case where it is preferable that the thermoplastic resin contains wax including polyolefin having a low molecular weight (weight average molecular weight of less than or equal to 10,000).

Further, the porous film in the laminated film has a thickness of preferably greater than or equal to 3 μm and less than or equal to 30 μm, and more preferably greater than or equal to 3 μm and less than or equal to 25 μm. Also, in the present embodiment, the laminated film has a thickness of preferably greater than or equal to 30 µm and less than or equal to 40 µm. Assuming that the thickness of the heat resistant porous layer is A (µm) and the thickness of the porous film is B (µm), it is preferable that, the value of A/B is greater than or equal to 0.1 and less than or equal to 1.

In the present embodiment, in order that the electrolyte penetrates well during use of the battery (during charging and discharging), it is preferable that the separator has an air resistance by Gurley method specified in JIS P8117 of preferably greater than or equal to 50 seconds/100 cc and less than or equal to 300 seconds/100 cc, and more preferably greater than or equal to 50 seconds/100 cc and less than or equal to 200 seconds/100 cc.

Also, the porosity of the separator is preferably greater than or equal to 30 volume % and less than or equal to 80 volume %, and more preferably greater than or equal to 40 volume % and less than or equal to 70 volume %. The separator may be a laminate of separators of different porosities.

(Electrolytic Solution)

The electrolytic solution in the lithium secondary battery of the present embodiment contains an electrolyte and an organic solvent.

The electrolyte included in the electrolytic solution may be lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB stands for bis(oxalato) borate), LiFSI (here, FSI stands for bis(fluorosulfonyl)imide), lower aliphatic carboxylic acid lithium salt, $LiAlCl_4$, or may be a mixture of two or more of the aforementioned lithium salts. Among these electrolytes, it is preferable to use at least one selected from a group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$, containing fluorine.

The organic solvent included in the electrolytic solution may be, for example, carbonates such as propylene carbonate, ethylene carbonate, dimethyl carbonate, diethyl carbonate, ethylmethyl carbonate, 4-trifluoromethyl-1,3-dioxolane-2-one, 1,2-di(methoxycarbonyloxy)ethane; ethers such as 1,2-dimethoxyethane, 1,3-dimethoxypropane, pentafluoropropylmethylether, 2,2,3,3-tetrafluoropropyldifluoromethylether, tetrahydrofuran, 2-methyltetrahydrofuran; esters such as methyl formate, methyl acetate, γ-butyrolactone; nitriles such as acetonitrile and butyronitrile; amides such as N,N-dimethylformamide and N,N-dimethylacetamide; carbamates such as 3-methyl-2-oxazolidone; sulphur-containing compounds such as sulfolane, dimethylsulfoxide, and 1,3-propane sultone, or a solvent produced by further introducing a fluoro group into the above-described organic solvent (a solvent which is obtained by substituting one or more hydrogen atoms included in the organic solvent by one or more fluorine atoms).

The organic solvent is preferably a mixture of two or more of the above. Among them, a mixed solvent including carbonates is preferable, and a mixed solvent of cyclic carbonate and acyclic carbonate and a mixed solvent of cyclic carbonate and ether are more preferable. The mixed solvent of cyclic carbonate and acyclic carbonate is preferably a mixed solvent including ethylene carbonate, dimethyl carbonate and ethylmethyl carbonate. An electrolytic solution using such a mixed solvent has various advantages such as a greater operating temperature range, resistance to deterioration even if discharged and charged at a higher current rate, resistance to deterioration even if used for a long period of time, and low degradability even if a graphite material such as natural graphite and artificial graphite is used as an active material of the negative electrode.

The electrolytic solution is preferably an electrolytic solution containing a lithium salt including fluorine, such as $LiPF_6$, and an organic solvent having a fluorine substituent, since it provides a higher level of safety for the obtained lithium secondary battery. A mixed solvent including ethers having a fluorine substituent such as pentafluoropropylmethylether and 2,2,3,3-tetrafluoropropyldifluoromethylether and dimethyl carbonate is further preferable, since a capacity retention is high even if discharged and charged at a high current rate.

Alternatively, a solid electrolyte may be used in place of the electrolytic solution. A solid electrolyte may be, for example, an organic polyelectrolyte such as a polyethylene oxide-based high molecular compound or a high molecular compound including at least one of a polyorganosiloxane chain and a polyoxyalkylene chain. Alternatively, a so-called gel type electrolyte may also be used in which a nonaqueous electrolytic solution is retained in a high molecular compound. Further, an inorganic solid electrolyte including sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$ and $Li_2S$—$GeS_2$—$P_2S_5$, or a mixture of two or more of them may be used. By using these solid electrolytes, the safety level of the lithium secondary battery may be further improved.

When a solid electrolyte is used in the lithium secondary battery of the present embodiment, there may be a case where the solid electrolyte serves as a separator, and, in such a case, a separator may not be required.

Since the positive electrode active material of the above configuration is the lithium metal composite oxide of the present embodiment, the lithium secondary battery using the positive electrode active material can be made to exhibit a battery resistance lower than that of the conventional positive electrode active material below freezing point.

Also, the positive electrode of the above configuration has the positive electrode active material that is the lithium metal composite oxide of the present embodiment, and thus, the lithium secondary battery can be made to exhibit a low battery resistance below freezing point.

Further, since the lithium secondary battery of the above configuration has the aforementioned positive electrode, a lithium secondary battery exhibiting a battery resistance lower than conventional lithium secondary battery below freezing point is obtained.

EXAMPLES

The present disclosure will now be described in detail with reference to the examples.

In the present examples, evaluation of lithium metal composite oxides (positive electrode active material) and evaluation of the manufacture of the positive electrodes and the lithium secondary batteries were performed as follows.

(1) Evaluation of Positive Electrode Active Material for Lithium Secondary Battery 1. Composition Analysis of Positive Electrode Active Material for Lithium Secondary Battery Composition analysis of the lithium metal composite oxide produced by a method described below was performed by dissolving powder of the obtained lithium metal composite oxide in hydrochloric acid, and thereafter using an inductively coupled plasma emission spectrometry apparatus (manufactured by SIT nanotechnology Co., Ltd., SPS3000).

2. Measurement of Primary Particle Size of Positive Electrode Active Material for Lithium Secondary Battery Particles of the lithium metal complex oxide to be measured were placed on a conductive sheet adhered on a sample stage, and, using JSM-5510 manufactured by JEOL Ltd., SEM observation was carried out by irradiating an electron beam of an accelerating voltage of 20 kV. 50 primary particles were extracted at random from an image (SEM image) obtained by SEM observation, and, for each primary particle, a projection image of the primary particle was placed between parallel lines extending in a certain direction, and a distance between the parallel lines (Feret's diameter) was measured as a particle size of the primary particle. An arithmetic mean value of the obtained particle sizes was defined as an average primary particle size of the lithium metal composite oxide.

3. Measurement of Secondary Particle Size of Positive Electrode Active Material for Lithium Secondary Battery 0.1 g of powder of the lithium metal complex oxide to be measured was added into 50 ml of 0.2 mass % aqueous solution of sodium hexametaphosphate to obtain a dispersion in which the said powder is dispersed. Using Mastersizer 2000 (laser diffraction scattering particle size distribution measuring apparatus) manufactured by Malvern Instruments Ltd., a particle size distribution is measured for the obtained dispersion, and a volume-based cumulative particle size distribution curve was obtained. On the obtained cumulative particle size distribution curve, a value of the particle size from the microparticle side for 50% accumulation ($D_{50}$) was defined as a secondary particle size of the positive electrode active material.

4. Crystallite Size Measurement of Positive Electrode Active Material for Lithium Secondary Battery The X-ray powder diffraction measurement of the lithium metal composite oxide was carried out using an X-ray diffractometer (X'Pert PRO, PANalytical B.V.). The obtained lithium metal composite oxide was filled on a dedicated substrate, and measurement was carried out using a Cu-Kα radiation source in a range of diffraction angle 2θ=10°-90° to obtain an X-ray powder diffraction diagram. Using an X-ray powder diffraction pattern synthesis analysis software JADE5, a full width half maximum of a peak corresponding to peak A and a full width half maximum of a peak corresponding to peak B were obtained from the said powdery X-ray diffraction diagram, and by Scherrer expression, crystallite diameters were calculated.

peak A: 2θ=18.7±1° peak B: 2θ=44.6±1°

5. Pore Distribution Measurement of Positive Electrode Active Material for Lithium Secondary Battery by Mercury Intrusion Method As a pretreatment, the lithium metal composite oxide was dried at a constant temperature at 120° C. for four hours. Using Auto Pore III9420 (manufactured by Micromeritics Instrument Corporation), pore distribution measurement was carried out under the following measurement conditions. The surface tension of mercury was 480 dynes/cm, and an angle of contact between mercury and the sample was 140°.

Measurement Conditions
Measurement Temperature: 25° C.
Measurement Pressure: 1.07 psia-59256.3 psia 6. BET Specific Surface Area Measurement of Positive Electrode Active Material for Lithium Secondary Battery 1 g of powder of the lithium metal complex oxide to be measured was dried at 150° C. for 15 minutes under a nitrogen atmosphere, and thereafter, it was measured using FlowSorb II2300 manufactured by Micromeritics Instrument Corporation.

(2) Manufacture of Positive Electrode

A positive electrode mixture in paste form was prepared by adding and kneading a lithium metal composite oxide (positive electrode active material) obtained by a manufacturing method described below, a conductive material (acetylene black: graphite=9:1 (mass ratio)), and a binder (PVdF) such that the composition is:
Positive Electrode Active Material:Conductive Material: Binder=92:5:3 (mass ratio).
In preparing the positive electrode mixture, N-methyl-2-pyrrolidone was used as an organic solvent.

The obtained positive electrode mixture was applied to an Al foil having a thickness of 40 μm serving as a collector, and vacuum dried at 150° C. for 8 hours to obtain a positive electrode. This positive electrode has an electrode area of 1.65 $cm^2$.

(3) Manufacture of Lithium Secondary Battery (Coin Cell)

The following operation was performed in a glovebox under an argon atmosphere.

The positive electrode manufactured as described under "(2) Manufacture of Positive Electrode" was placed on a lower cover of a coin cell for coin battery R2032 (manufactured by Hohsen Corp.) with an aluminum foil side facing downwards and a laminated film separator (heat resistant porous layers laminated on a porous film made of polyethylene (thickness 16 μm)) was placed thereon. Therein, 300 μl electrolytic solution was injected. The electrolytic solution used was prepared by dissolving vinyl carbonate and $LiPF_6$ in a mixed solution of ethylene carbonate, dimethyl carbonate and ethylmethyl carbonate at 16:10:74 (volume ratio) such that vinyl carbonate is 1 vol % and $LiPF_6$ is 1.3 mol/l.

Then, using artificial graphite (MAGD manufactured by Hitachi Chemical Co., Ltd.) as a negative electrode, the negative electrode is placed on an upper side of the laminated film separator, a upper cover is placed via a gasket and crimped by a crimping device to manufacture a lithium secondary battery (coin battery R2032. Hereinafter, also referred to as a "coin battery").

(4) Charge-Discharge Test

A charge-discharge test was carried out under conditions indicated below using a coin battery manufactured as described under "(3) Manufacture of Lithium Secondary Battery (Coin Cell)". The charge capacity and the discharge capacity in the charge-discharge test were respectively determined as follows.

(Charge-Discharge Test Conditions)
Test Temperature: 25° C.
Charging Condition: maximum charging voltage 4.2 V, charging time 5 hours, charging current 0.2 CA
Discharging Condition: minimum discharging voltage 2.7 V, discharging time 5 hours, discharging current 0.2 CA
(Battery Resistance Measurement)

The discharge capacity measured as described above was defined as depth of charge (hereinafter, also referred to as SOC) 100%, and battery resistance measurements for SOC 50% and SOC 100% were performed at −30° C. It is to be noted that adjustment to each SOC was carried out under a 25° C. environment. The battery resistance measurement was performed by placing a SOC-adjusted coin cell in a −30° C. constant temperature bath and maintaining at rest for two hours, discharging for 15 seconds at 20 μA, maintaining at rest for 5 minutes, charging for 15 seconds at 20 μA, maintaining at rest for 5 minutes, charging for 15 seconds at 40 μA, maintaining at rest for 5 minutes, charging for 30 seconds at 20 μA, maintaining at rest for 5 minutes, discharging for 15 seconds at 80 μA, maintaining at rest for 5 minutes, charging for 60 seconds at 20 μA, maintaining at rest for 5 minutes, discharging for 15 seconds at 160 μA, maintaining at rest for 5 minutes, charging for 120 seconds at 20 μA, and maintaining at rest for 5 minutes, in this order. As to the battery resistance, gradient was calculated using a least square approximation method from a plot of cell voltage and each current value measured after 10 seconds while discharging at 20 μA, 40 μA, 80 μA, and 120 μA, and this gradient defined as the battery resistance.

Example 1

1. Manufacture of Positive Electrode Active Material 1

Water was introduced into a reaction tank provided with an agitator and an over flow pipe, and thereafter an aqueous sodium hydroxide solution was added.

An aqueous nickel sulfate solution, an aqueous cobalt sulfate solution and an aqueous manganese sulfate solution were mixed such that an atomic ratio of nickel atoms, cobalt atoms and manganese atoms is 0.33:0.33:0.33 to prepare a mixed raw material liquid.

Then, while agitating, the mixed raw material solution and an aqueous ammonium sulfate solution were continuously added as a complexing agent into the reaction tank, and an aqueous sodium hydroxide solution was dropped as appropriate such that pH of the solution in the reaction tank becomes 11.7, and nickel cobalt manganese composite hydroxide particles were obtained. The obtained particles were cleaned with water after filtration, and dried at 100° C. to obtain dry powder of the nickel cobalt manganese composite hydroxide. The nickel cobalt manganese composite hydroxide had a BET specific surface area of 13.1 $m^2/g$.

The dry powder of nickel cobalt manganese composite hydroxide which was obtained as described above and lithium carbonate powder were weighed and mixed such that Li/(Ni+Co+Mn)=1.07, and thereafter baked for 10 hours at 950° C. under atmosphere to obtain a target positive electrode active material 1, namely, lithium-nickel cobalt manganese composite oxide.

2. Evaluation of Lithium Metal Composite Oxide

Composition analysis of the obtained positive electrode active material 1 showed that the molar ratio of Li:Ni:Co:Mn is 1.02:0.34:0.33:0.33.

The positive electrode active material 1 had a primary particle size and a secondary particle size of 0.49 μm and 3.5 μm, respectively.

The crystallite sizes calculated from peak A and peak B of the positive electrode active material 1 were 919 Å and 504 Å, respectively.

Figure 2:
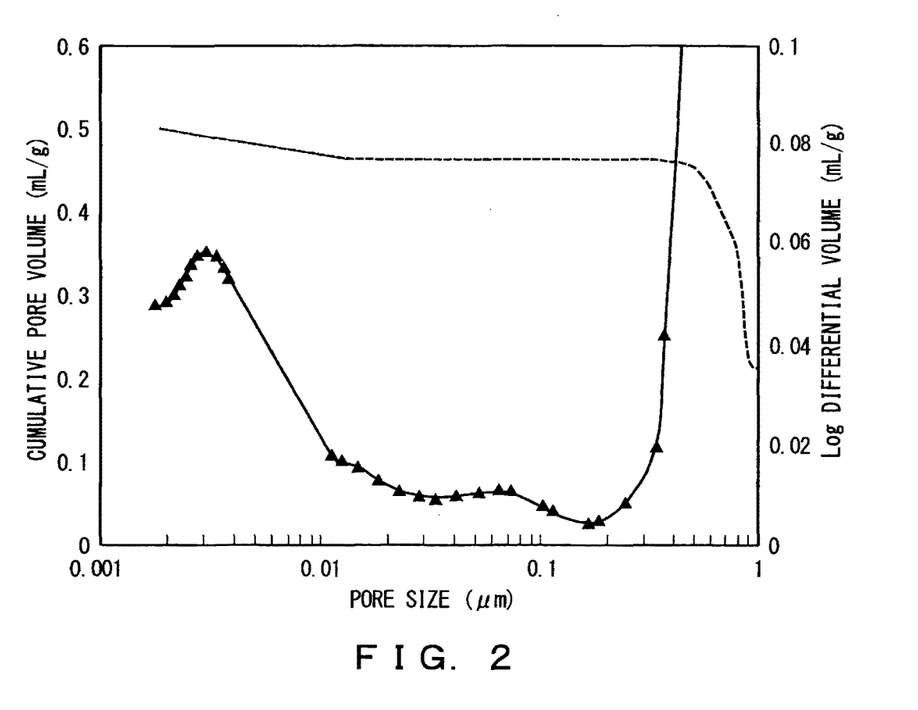
FIG. 2 is a diagram showing a pore distribution measurement result for a positive electrode active material 1 of Example 1.

As can be seen from the pore distribution measurement result (FIG. 2), the positive electrode active material 1 had a peak at 65 nm and a pore volume in a range of 10 nm to 200 nm was 0.012 $cm^3/g$. The BET specific surface area was 1.0 $m^2/g$.

3. Battery Resistance Measurement of Lithium Secondary Battery at −30° C.

A coin battery was manufactured using the positive electrode active material 1, and the battery resistances at −30° C. at SOC 100% and SOC 50% were 1259Ω and 1538Ω, respectively.

Example 2

1. Manufacture of Positive Electrode Active Material 2

A nickel cobalt manganese composite hydroxide was obtained by conducting an operation similar to Example 1 except that pH in the reaction tank was set at 12.6. The BET specific surface area of this nickel cobalt manganese composite hydroxide was 38.5 $m^2/g$.

To the dry powder of the nickel cobalt manganese composite hydroxide obtained as described above, lithium carbonate was mixed such that Li: (Ni+Co+Mn) is 1.07:1, and baked while maintaining at 950° C. for 10 hours, and cooled to room temperature to obtain the positive electrode active material 2.

2. Evaluation of Lithium Metal Composite Oxide

Composition analysis of the obtained positive electrode active material 2 showed that the molar ratio of Li:Ni:Co:Mn was 1.10:0.34:0.33:0.33.

The positive electrode active material 2 had a primary particle size and a secondary particle size of 0.37 μm and 2.6 μm, respectively.

The crystallite sizes calculated from peak A and peak B of the positive electrode active material 2 were 994 Å and 589 Å, respectively.

As can be seen from the pore distribution measurement result, the positive electrode active material 2 had a peak at 74 nm and a pore volume in a range of 10 nm to 200 nm was 0.030 $cm^3/g$. The BET specific surface area was 1.9 m2/g.

3. Battery Resistance Measurement of Lithium Secondary Battery at −30° C.

A coin battery was manufactured using the positive electrode active material 2, and the battery resistance at −30° C. for SOC 100% and SOC 50% was 1219Ω and 1294Ω, respectively.

Example 3

1. Manufacture of Positive Electrode Active Material 3

An operation similar to Example 2 except that baking was performed at 850° C. was conducted to obtain a positive electrode active material 3.

2. Evaluation of Lithium Metal Composite Oxide

Composition analysis of the obtained positive electrode active material 3 showed that the molar ratio of Li:Ni:Co:Mn was 1.05:0.34:0.33:0.33.

The positive electrode active material 3 had a primary particle size and a secondary particle size of 0.19 μm and 2.7 μm, respectively.

The crystallite sizes calculated from peak A and peak B of the positive electrode active material 3 were 640 Å and 429 Å, respectively.

As can be seen from the pore distribution measurement result, the positive electrode active material 3 had a peak at 95 nm and a pore volume in a range of 10 nm to 200 nm was 0.034 $cm^3/g$. The BET specific surface area was 2.6 $m^2/g$.

3. Battery Resistance Measurement of Lithium Secondary Battery at −30° C.

A coin battery was manufactured using the positive electrode active material 3, and the battery resistance at −30° C. for SOC 100% and SOC 50% was 1374Ω and 1418Ω, respectively.

Example 4

1. Manufacture of Positive Electrode Active Material 4

A nickel cobalt manganese composite hydroxide was obtained by conducting an operation similar to Example 1 except that pH in the reaction tank was set at 12.0. The BET specific surface area of this nickel cobalt manganese composite hydroxide was 20.8 $m^2/g$.

To the dry powder of the nickel cobalt manganese composite hydroxide obtained as described above, lithium carbonate was mixed such that Li: (Ni+Co+Mn) is 1.07:1, and baked while maintaining at 950° C. for 10 hours, and cooled to room temperature to obtain the positive electrode active material 4.

2. Evaluation of Lithium Metal Composite Oxide

Composition analysis of the obtained positive electrode active material 4 showed that the molar ratio of Li:Ni:Co:Mn was 1.08:0.33:0.33:0.34.

The positive electrode active material 4 had a primary particle size and a secondary particle size of 0.46 µm and 3.1 µm, respectively.

The crystallite sizes calculated from peak A and peak B of the positive electrode active material 4 were 994 Å and 547 Å, respectively.

As can be seen from the pore distribution measurement result, the positive electrode active material 4 had a peak at 108 nm and a pore volume in a range of 10 nm to 200 nm was 0.025 cm$^3$/g. The BET specific surface area was 1.3 m$^2$/g.

3. Battery Resistance Measurement of Lithium Secondary Battery at −30° C.

A coin battery was manufactured using the positive electrode active material 4, and the battery resistance at −30° C. for SOC 100% and SOC 50% was 1207Ω and 1367Ω, respectively.

Example 5

1. Manufacture of Positive Electrode Active Material 5

A nickel cobalt manganese composite hydroxide was obtained by conducting an operation similar to Example 1 except that pH in the reaction tank was set at 12.5. The BET specific surface area of this nickel cobalt manganese composite hydroxide was 49.9 m$^2$/g.

To the dry powder of the nickel cobalt manganese composite hydroxide obtained as described above, lithium carbonate was mixed such that Li: (Ni+Co+Mn) is 1.07:1, and baked while maintaining at 950° C. for 10 hours, and cooled to room temperature to obtain the positive electrode active material 5.

2. Evaluation of Lithium Metal Composite Oxide

Composition analysis of the obtained positive electrode active material 5 showed that the molar ratio of Li:Ni:Co:Mn was 1.09:0.33:0.34:0.33.

The positive electrode active material 5 had a primary particle size and a secondary particle size of 0.37 µm and 2.7 µm, respectively.

The crystallite sizes calculated from peak A and peak B of the positive electrode active material 5 were 970 Å and 601 Å, respectively.

As can be seen from the pore distribution measurement result, the positive electrode active material 5 had a peak at 95 nm and a pore volume in a range of 10 nm to 200 nm was 0.030 cm$^3$/g. The BET specific surface area was 1.9 m$^2$/g.

3. Battery Resistance Measurement of Lithium Secondary Battery at −30° C.

A coin battery was manufactured using the positive electrode active material 5, and the battery resistance at −30° C. for SOC 100% and SOC 50% was 1217Ω and 1280Ω, respectively.

Comparative Example 1

1. Manufacture of Positive Electrode Active Material 6

A nickel cobalt manganese composite hydroxide was obtained by conducting an operation similar to Example 1 except that pH in the reaction tank was set at 8.6. The BET specific surface area of this nickel cobalt manganese composite hydroxide was 9.3 m$^2$/g.

To the dry powder of the nickel cobalt manganese composite hydroxide obtained as described above, lithium hydroxide was mixed such that Li: (Ni+Co+Mn) is 1.05:1, and baked while maintaining at 1000° C. for 10 hours, and cooled to room temperature to obtain the positive electrode active material 6.

2. Evaluation of Lithium Metal Composite Oxide

Composition analysis of the obtained positive electrode active material 6 showed that the molar ratio of Li:Ni:Co:Mn was 0.83:0.33:0.32:0.35.

The positive electrode active material 6 had a primary particle size and a secondary particle size of 1.01 µm and 8.1 µm, respectively.

The crystallite sizes calculated from peak A and peak B of the positive electrode active material 6 were 1118 Å and 721 Å, respectively.

As can be seen from the pore distribution measurement result, the positive electrode active material 6 had no peak in a range of 10 nm to 200 nm. The BET specific surface area was 0.4 m$^2$/g.

3. Battery Resistance Measurement of Lithium Secondary Battery at −30° C.

A coin battery was manufactured using the positive electrode active material 6, and the battery resistance at −30° C. for SOC 100% and SOC 50% was 3147Ω and 3468Ω, respectively.

Comparative Example 2

1. Manufacture of Positive Electrode Active Material 7

A nickel cobalt manganese composite hydroxide was obtained by conducting an operation similar to Example 1 except that pH in the reaction tank was set at 11.8 and the agitating condition was modified as appropriate. The BET specific surface area of this nickel cobalt manganese composite hydroxide was 12.8 m$^2$/g.

The dry powder of the nickel cobalt manganese composite hydroxide obtained as described above and lithium carbonate powder were weighed and mixed such that Li/(Ni+Co+Mn)=1.05, and baked under atmosphere at 890° C. for 30 hours, and the product was sieved. After sieving, second baking of the product was performed under atmosphere at 890° C. for 4 hours, to obtain the target positive electrode active material 7, in other words, a lithium-nickel cobalt manganese composite oxide.

2. Evaluation of Lithium Metal Composite Oxide

Composition analysis of the obtained positive electrode active material 7 showed that the molar ratio of Li:Ni:Co:Mn was 1.02:0.33:0.34:0.33.

The positive electrode active material 7 had a primary particle size and a secondary particle size of 0.52 µm and 5.0 respectively.

The crystallite sizes calculated from peak A and peak B of the positive electrode active material 7 were 909 Å and 461 Å, respectively.

As can be seen from the pore distribution measurement result, the positive electrode active material 7 had no peak in a range of 10 nm to 200 nm. The BET specific surface area was 0.7 m$^2$/g.

3. Battery Resistance Measurement of Lithium Secondary Battery at −30° C.

A coin battery was manufactured using the positive electrode active material 7, and the battery resistance at −30° C. for SOC 100% and SOC 50% was 1815Ω and 2207Ω, respectively.

TABLE 1

|  | PRIMARY PARTICLE SIZE (μm) | SECONDARY PARTICLE SIZE (μm) | CRYSTALLITE SIZE PEAK A (Å) | CRYSTALLITE SIZE PEAK B (Å) | PORE PEAK | PORE PEAK VOLUME ($cm^3/g$) | BET SPECIFIC SURFACE AREA ($m^2/g$) |
| --- | --- | --- | --- | --- | --- | --- | --- |
| EXAMPLE 1 | 0.49 | 3.5 | 919 | 504 | YES | 0.011 | 1.0 |
| EXAMPLE 2 | 0.37 | 2.6 | 994 | 589 | YES | 0.030 | 1.9 |
| EXAMPLE 3 | 0.19 | 2.7 | 640 | 429 | YES | 0.034 | 2.6 |
| EXAMPLE 4 | 0.46 | 3.1 | 994 | 547 | YES | 0.025 | 1.3 |
| EXAMPLE 5 | 0.37 | 2.7 | 970 | 601 | YES | 0.030 | 1.6 |
| COMPARATIVE EXAMPLE 1 | 1.01 | 8.1 | 1118 | 721 | NO | — | 0.4 |
| COMPARATIVE EXAMPLE 2 | 0.52 | 5.0 | 909 | 461 | NO | — | 0.7 |

The result of evaluation indicates that each of the lithium secondary batteries in which the lithium metal composite oxides of Examples 1 to 5 are used as the positive electrode active material has a lower battery resistance, in other words, higher power, than lithium secondary batteries in which the lithium metal composite oxides of Comparative Examples 1 and 2 are used as the positive electrode active material below freezing point.

LIST OF REFERENCE SIGNS 1 separator,
2 positive electrode,
3 negative electrode,
4 electrode group,
5 battery can,
6 electrolyte,
7 top insulator,
8 sealing,
10 nonaqueous electrolyte secondary battery,
21 positive electrode lead,
31 negative electrode lead

What is claimed is:

1. A positive electrode active material for a lithium secondary battery, the positive electrode active material having a layered structure and satisfying all of the following requirements (1) to (3):
   (1) a primary particle size is greater than or equal to 0.1 μm and less than or equal to 0.49 μm and a secondary particle size is greater than or equal to 1 μm and less than or equal to 10 μm;
   (2) in an X-ray powder diffraction measurement using CuKα radiation,
   a crystallite size in the peak within 2θ=18.7 ±1° is 100 Å to 1200 Å and
   a crystallite size in the peak within 2θ=44.6 ±1° is 100 Å to 700 Å; and
   (3) in a pore distribution obtained by a mercury intrusion method,
   a pore peak exists in a range where the pore size is 10 nm to 200 nm and a pore volume in the said range is 0.01 $cm^3/g$ to 0.05 $cm^3/g$,
   wherein the positive electrode active material is represented by the general formula $Li_aM^1_sM^2_{1-s}O_2$, where $M^1$ represents an essential metal comprising one or more of Ni, Co and Mn, $M^2$ represents one or more optional metal among Fe, Cu, Ti, Mg, Al, W, Zn, Zr, Ga and V, "a" is 0.9≤a≤1.2, and "s" is 0.9 ≤s≤1.

2. The positive electrode active material for a lithium secondary battery according to claim 1, wherein the secondary particle size is greater than or equal to 1 μm and less than or equal to 5 μm.

3. The positive electrode active material for a lithium secondary battery according to claim 1, wherein the positive electrode active material has a BET specific surface area between about 0.8 $m^2/g$ to about 4 $m^2/g$.

4. The positive electrode active material for a lithium secondary battery according to claim 1, wherein the positive electrode active material has a void in the secondary particle.

5. The positive electrode active material for a lithium secondary battery according to claim 1, wherein the positive electrode active material is represented by the general formula $Li_aNi_xCo_yMn_zO_2$,
   where
   0.9≤a≤1.2,
   0.3<x<1,
   0≤y<0.4,
   0<z<0.4, and
   x+y+z=1.

6. The positive electrode active material for a lithium secondary battery according to claim 1, wherein the primary particle size is greater than or equal to 0.19 μm and less than or equal to 0.49 μm.

7. The positive electrode active material for a lithium secondary battery according to claim 1, wherein the one or more optional metal comprises W.

8. A positive electrode for a lithium secondary battery having a positive electrode active material, the positive electrode active material having a layered structure and satisfying all of the following requirements (1) to (3):
   (1) a primary particle size is greater than or equal to 0.1 μm and less than or equal to 0.49 μm and a secondary particle size is greater than or equal to 1 μm and less than or equal to 10 μm;
   (2) in an X-ray powder diffraction measurement using CuKαradiation,
   a crystallite size in the peak within 2θ=18.7 ±1° is 100 Å to 1200 Å and
   a crystallite size in the peak within 2θ=44.6 ±1° is 100 Å to 700 Å; and
   (3) in a pore distribution obtained by a mercury intrusion method,
   a pore peak exists in a range where the pore size is 10 nm to 200 nm and a pore volume in the said range is 0.01 $cm^3/g$ to 0.05 $cm^3/g$,
   wherein the positive electrode active material is represented by the general formula $Li_aM^1_sM^2_{1-s}O_2$, where M¹ represents an essential metal comprising one or more of Ni, Co and Mn, M² represents one or more optional metal among Fe, Cu, Ti, Mg, Al, W, Zn, Zr, Ga and V, "a" is 0.9a1.2, and "s" is $0.9 \leq s \leq 1$.

9. The positive electrode according to claim 8, wherein the secondary particle size is greater than or equal to 1 μm and less than or equal to 5 μm.

10. The positive electrode according to claim 8, wherein the positive electrode active material has a BET specific surface area between about 0.8 m²/g to about 4 m²/g.

11. The positive electrode according to claim 8, wherein the positive electrode active material has a void in the secondary particle.

12. The positive electrode according to claim 8, wherein the positive electrode active material is represented by the general formula $Li_aNi_xCo_yMn_zO_2$, where $0.9 \leq a \leq 1.2$, $0.3 < x < 1$, $0 \leq y < 0.4$, $0 < z < 0.4$, and $x+y+z=1$.

13. The positive electrode for a lithium secondary battery according to claim 8, wherein the one or more optional metal comprises W.

14. A lithium secondary battery having a positive electrode for a lithium secondary battery according to claim 8.

* * * * *